United States Patent
Leclerc et al.

(10) Patent No.: US 9,813,857 B2
(45) Date of Patent: Nov. 7, 2017

(54) METHODS AND APPARATUS FOR CREATING AN INDIVIDUALIZED RECORD OF AN EVENT

(71) Applicant: ESKI Inc., Montreal (CA)

(72) Inventors: Vincent Leclerc, Montreal (CA); Vadim Kravtchenko, Montreal (CA); Jean-Sébastien Rousseau, Montreal (CA); Justin Alexandre Francis, Montreal (CA)

(73) Assignee: ESKI Inc., Montreal (CA)

( * ) Notice: Subject to any disclaimer, the term of this patent is extended or adjusted under 35 U.S.C. 154(b) by 0 days.

(21) Appl. No.: 15/376,238

(22) Filed: Dec. 12, 2016

(65) Prior Publication Data

US 2017/0094459 A1    Mar. 30, 2017

Related U.S. Application Data

(63) Continuation of application No. PCT/CA2016/050718, filed on Jun. 20, 2016.
(Continued)

(51) Int. Cl.
*H04W 4/02* (2009.01)
*H04B 1/3827* (2015.01)
(Continued)

(52) U.S. Cl.
CPC ............ *H04W 4/02* (2013.01); *G01S 5/0252* (2013.01); *G06F 1/163* (2013.01); *G06T 11/206* (2013.01);
(Continued)

(58) Field of Classification Search
CPC ....... H04W 4/008; H04W 4/02; H04W 4/021; H04W 4/206; H04W 72/121;
(Continued)

(56) References Cited

U.S. PATENT DOCUMENTS 6,124,862 A    9/2000  Boyken et al.
7,203,524 B2   4/2007  Tushinsky et al.
(Continued)

FOREIGN PATENT DOCUMENTS

CA    2901602 A1    7/2014
CA    2919749 A1    2/2015
(Continued)

OTHER PUBLICATIONS

International Search Report and Written Opinion for Application No. PCT/CA2016/050684 dated Jul. 27, 2016.
(Continued)

*Primary Examiner* — Thai Vu
(74) *Attorney, Agent, or Firm* — Wolf, Greenfield & Sacks, P.C.

(57) ABSTRACT

Embodiments of the invention are directed to capturing a record of an event which is individualized to a specific event attendee. Event attendees carry a wearable device configured to periodically transmit a payload that may, for example, include an identifier for the wearable device. The device's transmissions may be received by one or more receiver components located at the event venue. Each receiver component may have one or more associated content capture components configured to capture content (e.g., video, audio, text, etc.) relating to the event as it is ongoing. The location of each receiver component over time is known, and so receipt of transmissions from the wearable device by different receiver components over time indicates an approximate location of the attendee over time, and thus the vantage point(s) from which the attendee witnessed the event. The attendee's location over time may be correlated with content captured from different locations during the same time period to create a record of the event which is individualized to the attendee.

28 Claims, 6 Drawing Sheets

Related U.S. Application Data (60) Provisional application No. 62/204,516, filed on Aug. 13, 2015.

(51) Int. Cl.
*H04W 76/02* (2009.01)
*H04B 17/318* (2015.01)
*H04L 29/08* (2006.01)
*G01S 5/02* (2010.01)
*G06F 1/16* (2006.01)
*G06T 11/20* (2006.01)
*H04W 52/28* (2009.01)

(52) U.S. Cl.
CPC ........... *H04B 1/385* (2013.01); *H04B 17/318* (2015.01); *H04L 67/10* (2013.01); *H04W 76/021* (2013.01); *H04W 52/283* (2013.01)

(58) Field of Classification Search
CPC H04W 76/021; H04W 52/283; H04B 17/318; H04B 1/385; H04L 67/10; G01S 5/0252; H04N 1/00137; H04N 7/181; G06F 1/163; G06Q 30/0261; G06Q 50/01; G06T 11/206
See application file for complete search history.

(56) References Cited

U.S. PATENT DOCUMENTS

| | | |
|---|---|---|
| 7,798,404 B2 | 9/2010 | Gelbman |
| 8,475,367 B1 | 7/2013 | Yuen et al. |
| 8,477,035 B2 | 7/2013 | Goldman et al. |
| 8,648,541 B2 | 2/2014 | Gerszberg et al. |
| 8,660,369 B2 | 2/2014 | Llano et al. |
| 8,740,391 B2 | 6/2014 | Leclerc et al. |
| 8,798,926 B2 | 8/2014 | Stroila et al. |
| 8,947,226 B2 | 2/2015 | Dugan |
| 8,956,303 B2 | 2/2015 | Hong et al. |
| 9,288,836 B1 | 3/2016 | Clement et al. |
| 9,474,137 B1 | 10/2016 | Wein |
| 2002/0199198 A1 | 12/2002 | Stonedahl |
| 2003/0014330 A1 | 1/2003 | Showghi et al. |
| 2005/0093976 A1 | 5/2005 | Valleriano et al. |
| 2006/0173701 A1 | 8/2006 | Gurvey |
| 2008/0045806 A1 | 2/2008 | Keppler |
| 2008/0046957 A1* | 2/2008 | Doffing .................. H04N 5/222 725/142 |
| 2009/0032586 A1 | 2/2009 | Hunt |
| 2009/0270743 A1 | 10/2009 | Dugan et al. |
| 2010/0013918 A1 | 1/2010 | Ta'Ead |
| 2010/0285283 A1 | 11/2010 | Kingsbury |
| 2010/0309000 A1 | 12/2010 | Munthe-Kaas et al. |
| 2011/0256886 A1 | 10/2011 | Velusamy |
| 2011/0260830 A1 | 10/2011 | Weising |
| 2011/0276396 A1 | 11/2011 | Rathod |
| 2012/0072420 A1 | 3/2012 | Moganti et al. |
| 2012/0233158 A1 | 9/2012 | Braginsky et al. |
| 2012/0313759 A1 | 12/2012 | Markwitz et al. |
| 2013/0046542 A1 | 2/2013 | Papakipos et al. |
| 2013/0176142 A1 | 7/2013 | Drysdale et al. |
| 2013/0185750 A1 | 7/2013 | Ayoub |
| 2013/0231760 A1 | 9/2013 | Rosen et al. |
| 2013/0254137 A1 | 9/2013 | Hunt |
| 2013/0280682 A1 | 10/2013 | Levine et al. |
| 2013/0286223 A1* | 10/2013 | Latta .................. H04N 1/00347 348/207.1 |
| 2013/0325887 A1* | 12/2013 | Takaoka ............. G06K 9/00348 707/758 |
| 2014/0132181 A1 | 5/2014 | Gerszberg |
| 2014/0172980 A1 | 6/2014 | Russell |
| 2014/0184386 A1 | 7/2014 | Regler et al. |
| 2014/0205155 A1 | 7/2014 | Chung et al. |
| 2014/0236769 A1 | 8/2014 | Drake et al. |
| 2014/0344062 A1* | 11/2014 | Lamont .............. G06Q 30/0267 705/14.64 |
| 2015/0012308 A1 | 1/2015 | Snyder |
| 2015/0031294 A1 | 1/2015 | Holman et al. |
| 2015/0145655 A1 | 5/2015 | Slupik |
| 2015/0178532 A1 | 6/2015 | Brule |
| 2015/0187206 A1 | 7/2015 | Saurin et al. |
| 2015/0189056 A1 | 7/2015 | Magi |
| 2015/0222517 A1 | 8/2015 | McLaughlin et al. |
| 2015/0302310 A1 | 10/2015 | Wernevi et al. |
| 2015/0334772 A1 | 11/2015 | Wong et al. |
| 2015/0341903 A1 | 11/2015 | Jeong et al. |
| 2016/0007925 A1 | 1/2016 | Mirov et al. |
| 2016/0042364 A1 | 2/2016 | Zamer et al. |
| 2016/0174857 A1 | 6/2016 | Eggers et al. |
| 2016/0192193 A1 | 6/2016 | Lee |
| 2016/0205358 A1* | 7/2016 | Dickinson ............... H04N 7/181 348/157 |
| 2016/0247145 A1 | 8/2016 | Grimaux |
| 2016/0255068 A1 | 9/2016 | Pritchard et al. |
| 2016/0316542 A1 | 10/2016 | Wein |
| 2016/0381488 A1 | 12/2016 | Kreitzer et al. |
| 2017/0004685 A1 | 1/2017 | Karsten |
| 2017/0006414 A1 | 1/2017 | Tomassini et al. |
| 2017/0010664 A1 | 1/2017 | Tanaka et al. |
| 2017/0091205 A1 | 3/2017 | Leclerc et al. |
| 2017/0093447 A1 | 3/2017 | Leclerc et al. |

FOREIGN PATENT DOCUMENTS

| | | | |
|---|---|---|---|
| WO | WO 2006/100513 A1 | 9/2006 | |
| WO | WO 2014/100519 A1 | 6/2014 | |
| WO | WO 2014/143997 A1 | 9/2014 | |

OTHER PUBLICATIONS

International Search Report and Written Opinion for Application No. PCT/CA2016/050688 dated Aug. 19, 2016.
International Search Report and Written Opinion for Application No. PCT/CA2016/050778 dated Sep. 12, 2016.
International Search Report and Written Opinion for Application No. PCT/CA2016/050718 dated Sep. 23, 2016.

* cited by examiner

METHODS AND APPARATUS FOR CREATING AN INDIVIDUALIZED RECORD OF AN EVENT

RELATED APPLICATIONS

This application is a continuation of International Application No. PCT/CA2016/050718, filed Jun. 20, 2016, entitled "Methods And Apparatus For Creating An Individualized Record Of An Event," which claims priority to U.S. Provisional Application Ser. No. 62/204,516, filed Aug. 13, 2015, entitled "Methods And Apparatus For Creating An Individualized Record Of An Event," and to U.S. Provisional Application Ser. No. 62/201,340, filed Aug. 5, 2015, entitled "Methods And Apparatus For Creating An Individualized Record Of An Event." The entirety of each of the documents referenced above is incorporated herein by reference.

BACKGROUND

Organizers of events attended by large numbers of people (e.g., concerts, sporting events, cultural festivals, etc.) often take steps to prevent attendees from recording the proceedings and/or distributing such recordings to others. As a result, attendees are generally left with only their memory of the event as a record of their experience. While some event organizers may make recordings available of an event after it is over, these recordings often do not coincide with what attendees remember experiencing during the event. For example, an event organizer's recording may capture an event from a different vantage point than the vantage points from which some attendees viewed the event, may omit portions of the event which some attendees found memorable, or may otherwise present a version of the event that is different than what attendees remember experiencing.

SUMMARY

Some embodiments of the invention provide methods and apparatus for capturing an record of an event which is individualized to a specific attendee. In some embodiments of the invention, one or more attendees of an event may carry a wearable device during the event which is configured to periodically transmit a payload. The payload may, for example, include an identifier for the wearable device. The wearable device's transmissions may be received by one or more receiver components located at the event venue. Each receiver component may have one or more associated content capture components configured to capture content relating to the event as it is ongoing. For example, a content capture component may capture video, audio, and/or other form(s) of content of the event from a particular vantage point as the event is ongoing. The location of each receiver component over time is known, and so receipt of transmissions from the wearable device by different receiver components over time provides an indication of the attendee's approximate location at the event over time, and thus the vantage point(s) from which the attendee witnessed the event as it was held. The attendee's location over time may be correlated with content captured from different locations during the same time period to create a record of the event which is individualized for the attendee. The individualized record may be made available to the attendee in any of numerous forms.

The foregoing is a non-limiting summary of aspects of only certain embodiments of the invention. Some embodiments of the invention are described in further detail below.

BRIEF DESCRIPTION OF DRAWINGS

The accompanying drawings are not intended to be drawn to scale. In the drawings, each identical or nearly identical component illustrated in the various figures is represented by a like numeral. For purposes of clarity, not every component may be labeled in every drawing. In the drawings.

DETAILED DESCRIPTION

In some embodiments, techniques are provided for creating a record of an event which is individualized to an attendee of the event. The attendee may carry a wearable device during the event which is configured to periodically transmit a payload that includes an identifier for the wearable device. The wearable device's transmissions may be received by one or more receiver components located at the event, and each receiver component may have one or more associated content capture components configured to capture content relating to the event. The location of each receiver component and content capture component over time may be known, and so transmissions received from the wearable device by different receiver components over time may provide an indication of the attendee's approximate location over time, and thus the vantage point(s) from which the attendee witnessed the event over time. The attendee's location over time may be correlated with content captured from different locations during the same time period to create a record of the event which is individualized for the attendee.

It should be appreciated that although the term "event" is used below with reference to specific types of events at which large numbers of attendees congregate (e.g., concerts, festivals, sporting events, etc.), the invention is not limited to being used at events with multiple attendees, or at any particular type of event. For example, some embodiments of the invention may be used to create a personalized record of an event like a user's visit to a museum, exhibition, location (e.g., a walk in the woods or a visit to a garden), etc., and/or any other suitable event. The invention is not limited to being used in any particular setting.

Figure 1:
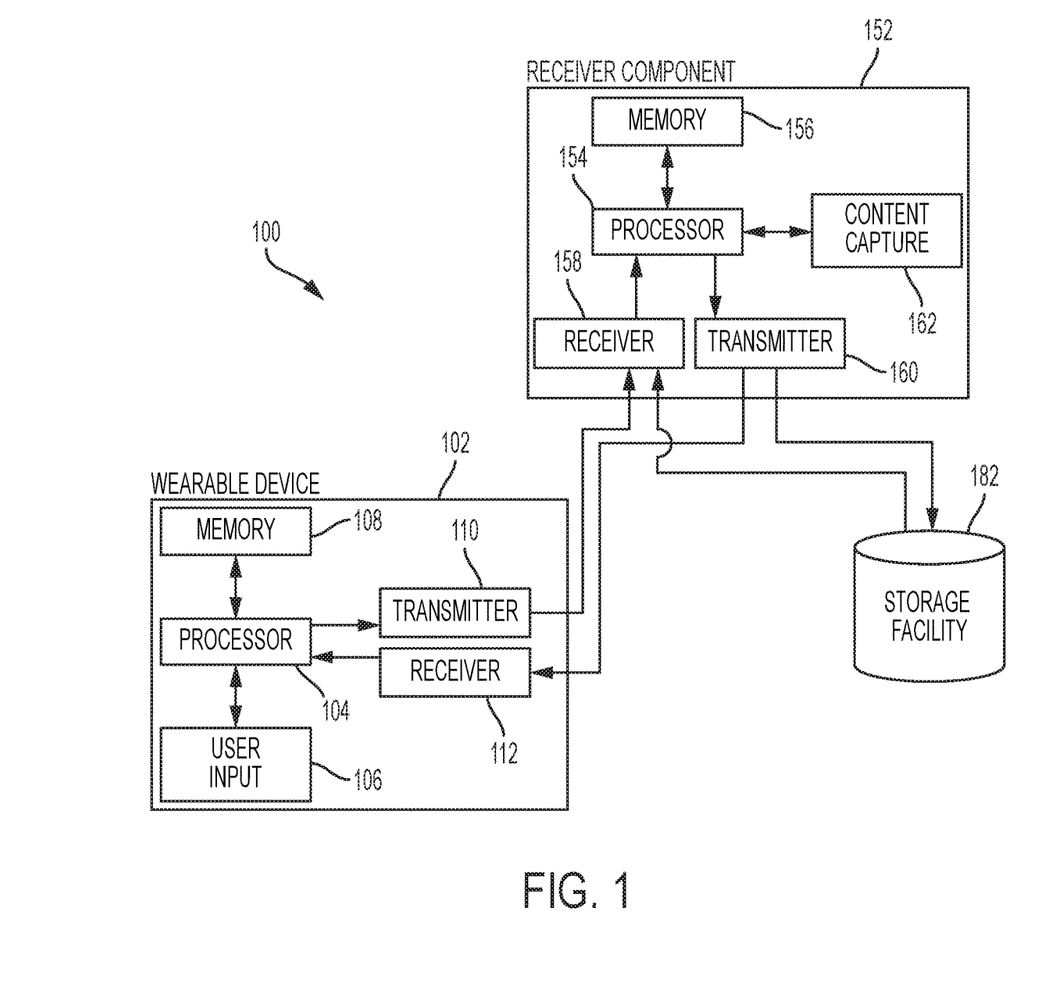
FIG. 1 is a block diagram depicting representative components of a system for producing an individualized record of an event, in accordance with some embodiments of the invention.

FIG. 1 depicts a representative system 100 for capturing a record of an event which is individualized to an attendee. Representative system 100 includes wearable device 102, receiver component 152 and storage facility 182. Although not shown in FIG. 1, in some implementations, system 100 may include plural wearable devices 102, receiver components 152 and/or storage facilities 182.

Wearable device 102 may comprise any item or component that an event attendee may wear, hold, carry or transport, such as a wristband, hat, necklace, badge, medal, eyeglasses, ball, and/or other item or component. In the example shown in FIG. 1, wearable device 102 includes processor 104 which communicates with memory 108 (e.g., storing programmed instructions for execution by processor 104), user input component 106 (described further below), transmitter 110 and receiver 112. Alternatively, wearable device 102 may comprise a radio frequency identification (RFID) tag (which may be a so-called "passive" or "active" tag), and so in some implementations wearable device 102 may not include a separate processor 104 and memory 108, but rather a microchip and/or other component(s) configured for enabling transmission of a payload.

In some embodiments, wearable device 102 is programmed to transmit (e.g., via transmitter 110) a payload to receiver component 152. The payload may, for example, include an identifier for wearable device 102, as well as any other suitable data. Wearable device 102 may transmit information using any suitable communication technique(s), protocol(s) and/or infrastructure. For example, in some embodiments, transmission may be accomplished using radio frequency, infrared, and/or any other suitable form of transmission(s). It should be appreciated that although wearable device 102 is shown in FIG. 1 as including a separate transmitter 110 and receiver 112, the invention is not limited to such an implementation, and may be configured for transmission and/or receipt of information via a single transceiver component.

Wearable device 102 may transmit a payload autonomously (e.g., according to a predetermined periodicity or schedule) and/or in response to a trigger event (e.g., a signal having been received from a receiver component 152, user input having been supplied to the device (e.g., via user input 106), and/or in response to any other suitable trigger event(s)).

In some embodiments, the transmission power of wearable device 102 may be adjusted (e.g., dynamically, manually, or some combination thereof) to conform to the physical distribution of multiple receiver components 152 at an event location. For example, if there are a relatively greater number of receiver components 152 (which may be defined in any suitable fashion) distributed throughout an event location, then the transmission power of wearable device 102 may be adjusted downward so as to reduce the amount of power consumed by the wearable device. Conversely, if a relatively smaller number of receiver components 152 are distributed throughout an event location, then transmission power may be increased to maximize the likelihood that a payload transmitted by a wearable device is received by a receiver component 152.

It should be appreciated that while in some embodiments a wearable device 102 may be distributed to event attendees by the organizer of the event, the invention is not limited to such an implementation. For example, in some embodiments, a wearable device 102 may comprise a mobile device which is owned and operated by the attendee prior to attendance at the event (e.g., a so-called "smartphone," tablet device, watch, and/or any other device suitably configured for communicating a payload).

Although in some embodiments the payload transmitted by a wearable device includes an identifier for the device itself, the invention is not limited to such an implementation. For example, the payload transmitted by a wearable device may include an identifier for the event attendee, which may or may not be associated with a separate identifier for the device. An attendee identifier may include his/her name, nickname, email address, age, social media profile, photograph, and/or any other identifying information. If separate attendee and device identifiers are used, these identifiers may be associated, and the association may be established in any suitable manner. For example, an attendee and corresponding device identifier may be associated as the attendee enters the event (e.g., when the wearable device is given to the attendee), in a booth at the event, via functionality provided by an application executing on a mobile device operated by the attendee (e.g., an "app" on his/her smartphone), and/or in any other suitable fashion using any other suitable component(s).

As noted above, although FIG. 1 depicts only a single receiver component 152, it should be appreciated that any suitable number of receiver components 152 may be situated at an event location to capture information transmitted by one or more wearable devices 102 at the event. In the example shown, receiver component 152 includes processor 154, which communicates via receiver 158 and transmitter 160 with wearable device 102 and storage facility 182 via any suitable communication technique(s), protocol(s) and/or infrastructure. Receiver component 152 also includes local memory 156, which may, for example, be used to temporarily store information received from one or more wearable devices 102 prior to the information being communicated to storage facility 182.

The receiver component 152 shown in FIG. 1 also includes content capture component 162. Component 162 may be configured to capture any suitable type of information, such as sound, video, images, text (e.g., scheduling information, descriptions, etc.) and/or other information relating to an event. Although the content capture component 162 is depicted in FIG. 1 as being integral to receiver component 152, the invention is not limited to such an implementation, as content capture component 162 may alternatively, or additionally, comprise a stand-alone device. For example, a content capture component could include a standalone video camera which is designed for capturing video and which is not integrated with a receiver component. Further, a content capture component may be stationary, mobile, or both (e.g., intermittently mobile when not fixed in a specific location). When stationary, a content capture component may be fixed to a scene, stand, entry point, etc. When mobile, a content capture component may be transported by a human (photographer, entertainer, etc.) and/or mechanical component(s) (e.g., mobile cart, transport apparatus suspended above an event venue, etc.). While in some embodiments each content capture component 162 may be associated with a single receiver component 152, in other embodiments a content capture component 162 may be associated with more than one receiver component 152, or multiple content capture components 162 may be associated with a single receiver component 152. Such associations may shift over time (e.g., during the course of an event).

Although FIG. 1 depicts content capture component 162 being directly connected to processor 154, it should be appreciated that such connection may, in some embodiments, be intermittent, such as if content capture component 162 is not integrated with receiver component 152. For example, a content capture component may not be connected to processor 154 for a period of time while it captures content, and may later be re-connected. Upon re-connection, content which was captured during the time content capture component 162 was disconnected may be synchronized with other content. Synchronization may be accomplished in any suitable fashion. In one example, if content capture component 162 includes a clock, then a timestamp generated by content capture component 162 may be used to synchronize content captured by the component with other content. If content capture component 162 does not include a clock but has the capability to receive information from other devices (e.g., messages with timestamps), then content capture component 162 may record a time of content capture in relation to the known time at which a message was received, and provide the recorded time (e.g., to storage facility 182) for use in synchronizing captured content with other content. In this respect, although content capture component 162 is depicted in FIG. 1 using a single polygon, it should be appreciated that, in some embodiments, it may include constituent elements which enable it to communicate with other devices. For example, content capture component 162 may include elements which enable it to receive information from other devices (e.g., receiver components 152) and send information to other devices (e.g., to storage facility 182), in addition to capturing content in any suitable form(s).

Figure 2:
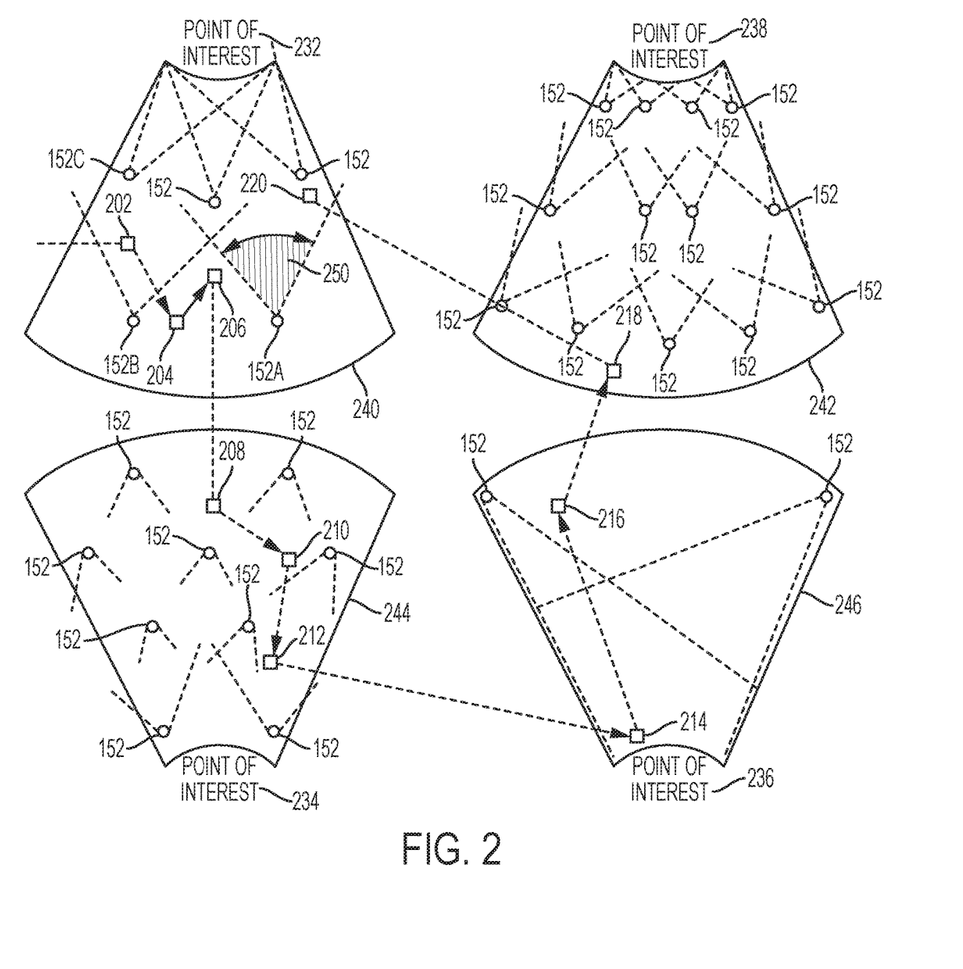
FIG. 2 is an illustration of content being captured from various locations at an event as an attendee moves throughout the event location, in accordance with some embodiments of the invention.

FIG. 2 depicts a representative installation at an event wherein multiple receiver components 152 are distributed throughout the event location and each has an integrated content capture component 162 (not specifically shown in FIG. 2). The event depicted in FIG. 2 encompasses proceedings (i.e., points of interest 232, 238, 234, 236)) occurring at four different venues 240, 242, 244 and 246, respectively. As an example, the event may be a concert festival, sporting event, etc. at which different happenings occur at different venues simultaneously. It should be appreciated, however, that embodiments of the invention are not limited to being used with concert festivals, sporting events, or any other specific type(s) of events, and are also not limited to being used with events at which multiple proceedings are ongoing at different venues simultaneously.

In the example shown in FIG. 2, the content capture component which is associated with each receiver component 152 captures content from a particular vantage point. As an example, the vantage point of the content capture component associated with receiver component 152A allows it to capture content within the vantage point that is represented symbolically at 250. This content capture component may, for example, comprise a video camera which is pointed toward point of interest 232 to capture proceedings on stage as well as a portion of the overall audience within its field of view who are watching the proceedings. Because the content capture component is integrated with receiver component 152A, the content it captures may approximate what is experienced by an attendee nearby receiver component 152A at any particular point during the event.

FIG. 2 also symbolically depicts the travels of an attendee through the different venues over the course of the event. The attendee transports a wearable device which transmits a payload periodically. When the wearable device's payload is received by a particular receiver component, that provides an indication that the attendee is nearby the receiver component at that time. By capturing the wearable device's payload over time by (potentially) multiple receiver components, embodiments of the invention may track the attendee's location over the course of an event.

Using FIG. 2 to illustrate, when the attendee is at location 202, the payload transmitted by the wearable device may be received by receiver components 152B and/or 152C, indicating that the attendee is nearby those receiver components at that time, and thus the approximate vantage point he/she may have enjoyed of point of interest 232 at that time. When the attendee then moves to location 204, the payload transmitted by the wearable device may be received by receiver component 152B, but not receiver component 152C, indicating that the attendee has moved toward receiver component 152B and providing further information on the attendee's vantage point at the time that the payload was received.

Some embodiments of the invention may provide functionality for arbitrating between receiver components which both receive a wearable device's payload at a particular time, providing a more specific indication of the attendee's location at that time. For example, in some embodiments, each receiver component may record a received signal strength indication (RSSI) for received payloads. If two receiver components record having received a payload from a particular wearable device at a particular time, then the receiver component which recorded the greatest corresponding RSSI may be deemed to be the receiver component closest to the wearable device at the time the payload was sent. For example, if a payload transmitted by a wearable device when the attendee is at location 204 is received by both of receiver components 152B and 152A, the RSSI recorded by each receiver component may indicate that the attendee is then closer to receiver component 152B than receiver component 152A (e.g., because the RSSI recorded by receiver component 152B is greater than that which is recorded by receiver component 152A). When the attendee then travels to location 206, the RSSI recorded by each receiver component may indicate that the attendee has moved closer to receiver component 152A than to receiver component 152B. As such, the attendee's location (and thus approximate vantage point) may be tracked more closely over time.

Of course, some embodiments of the invention may not use RSSI to approximate an attendee's location at a particular time, and any suitable technique(s) may be used. For example, some embodiments may employ technologies which approximate distance based upon "time of flight" of data transfers, such as IEEE 802.15.4 and/or other "ultra wide band" technologies. Other embodiments may approximate an attendee's location at a particular time based at least in part on differences in the time of arrival of data received from the attendee's wearable device and data received from one or more other wearable devices, such as which may be accomplished using variations of the Bluetooth protocol, and/or any other suitable communication system(s) and/or technique(s). Any suitable method(s) for approximating an attendee's location, whether now known or later developed, may be used.

As the attendee subsequently moves through locations 208-220, payloads transmitted by the wearable at different times may be used to associate the attendee with particular vantage points of different points of interest over time.

As noted above, although FIG. 2 depicts each receiver component 152 as being stationary, in some embodiments of the invention some or all of the receiver components 152 shown may be mobile. If a receiver component is mobile, its location over time may be tracked, in any suitable fashion.

Each receiver component 152 may send a record of information received over the course of the event to storage facility 182 (FIG. 1). This may be performed in any suitable fashion. For example, receiver components may send to storage facility 182 all of the information received, or some subset, as circumstances and/or requirements dictate. Receiver components may send information to the storage facility periodically, all at once (e.g., at the end of the event), in response to some trigger, and/or in any other suitable fashion.

It should also be appreciated that in embodiments which employ RFID tags as wearable devices, one or more receiver components may comprise an RFID reader, and/or one or more RFID readers may be installed separately from the receiver components 152 depicted in FIG. 2 and communicate information received to storage facility 182.

Figure 3:
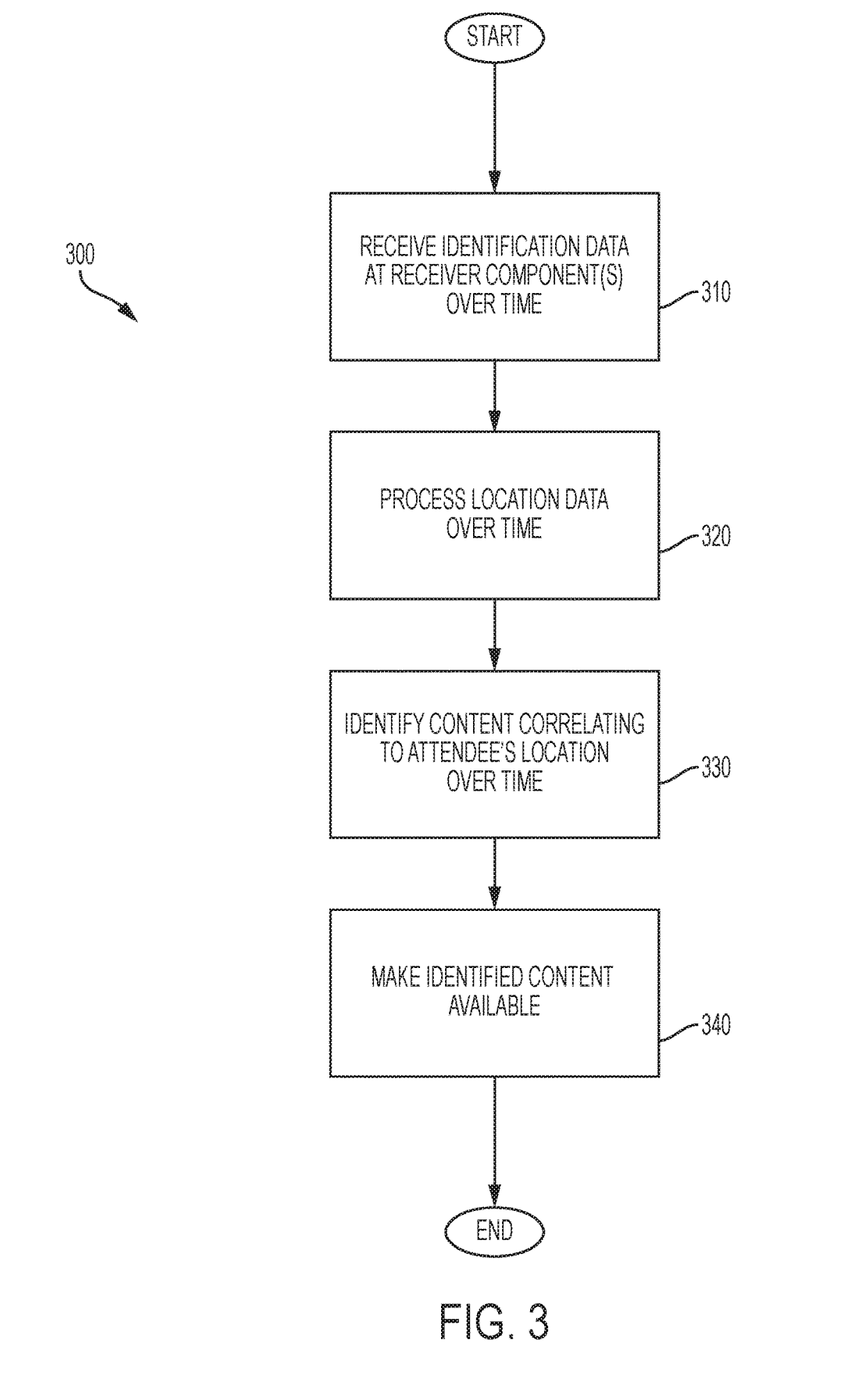
FIG. 3 is a flowchart depicting a representative process whereby record of an event which is individualized for an attendee may be captured and made available to the attendee, in accordance with some embodiments of the invention.

FIG. 3 depicts a representative process 300 for correlating an attendee's location over time with locations from which content is captured throughout an event, and making that content available to the user. At the start of representative process 300, in act 310, identification data is received at one or more receiver components located at an event over time. For example, payloads transmitted by a wearable device carried by the attendee may be received by the receiver component(s) over time. The time at which each payload is received may be provided by the wearable device (e.g., via one or more timestamps), be kept by the receiver component (e.g., and recorded using one or more timestamps), be supplied by another device (e.g., a mobile device operated by the attendee), or some combination thereof.

Representative process 300 then proceeds to act 320, in which location data for the attendee over time is processed. Processing may take any of numerous forms. For example, location data which is captured by multiple receiver components distributed throughout an event location over time may be provided to storage facility 182 for compilation. Location data may be compiled in any suitable fashion, as embodiments of the invention are not limited in this respect.

In act 330, content relating to the event which correlates to the attendee's location at various times throughout the event is identified. For example, content captured by various content capture components at particular times may be correlated with the attendee's location over time. This may be performed in any suitable fashion. In some embodiments, each content capture component, installed at a known location, may record the time at which content is captured. The attendee's location at any particular time may be matched to the location of a content capture component, and the content captured by that component at the particular time may be associated with the attendee.

Representative process 300 then proceeds to act 340, wherein the content which is identified in the act 330 is made available to the attendee. This may be performed in any suitable fashion. In some embodiments of the invention, content may be made available to attendees in accordance with direction provided by organizers of the event.

Figure 4:
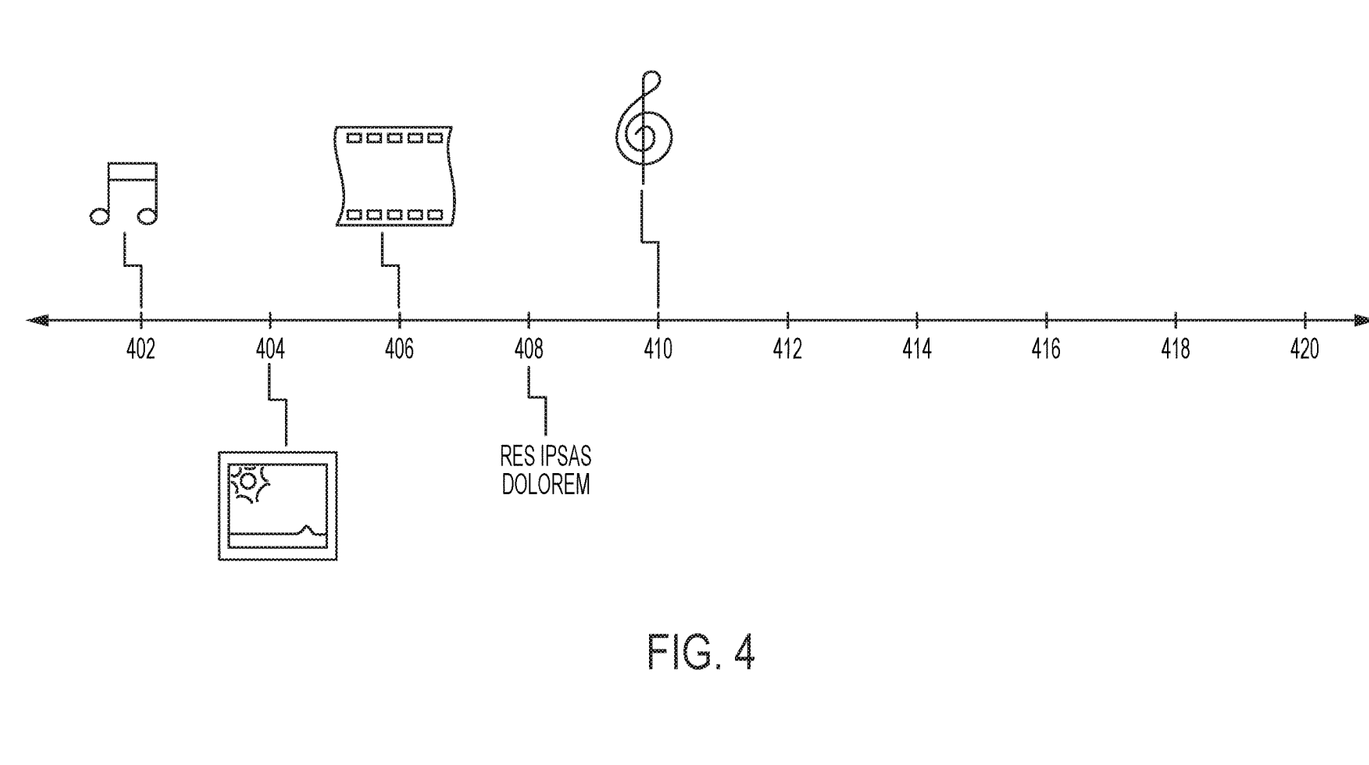
FIG. 4 depicts a representation of a body of content captured to coincide with an attendee's experience at an event, in accordance with some embodiments of the invention.

A representative manner of presentation of content for an event attendee is shown in FIG. 4. Specifically, FIG. 4 depicts a timeline which represents the time period over which the event occurred and specific points in time at which the attendee's location was known and content was captured nearby that location. In the example shown, each marker on the timeline represents a specific point in time at which the attendee's location was known (e.g., marker 402 may correspond to location 202 shown in FIG. 2, marker 404 may correspond to location 204, marker 406 may correspond to location 206, and so on). As FIG. 4 indicates, any suitable form of content may be associated with a particular point in time and made available to the attendee, and different types of content may be associated with different points in time. Thus, in FIG. 4, a music file is associated with marker 404, an image is associated with marker 404, a video file is associated with marker 406, text information is associated with marker 408, and another music file is associated with marker 410. Any suitable type(s) of content may be associated with any one or more points in time represented on a timeline or other representation of an event. For example, content may include an image captured from a vantage point at which an attendee was located at a particular time, a sample of music captured from a location nearby an attendee's location during an event, video or other multimedia content captured from a vantage point at which an attendee was located at a particular time, text depicting comments of other attendees at locations nearby an attendee throughout an event, metadata describing an event (e.g., a location within an event venue from which particular sound, video and/or text content was captured, weather conditions at the event, sound levels indicating crowd enthusiasm at particular times during the event, number of attendees at the event, number and/or type of social media posts during the event, etc.), metadata describing an attendee's surroundings (e.g., number of friends in close proximity, etc.), and/or any other suitable type(s) of content.

Content which is made available to an attendee may include content which depicts or represents the attendee herself, in addition to or instead of proceedings at the event. For example, content may include a photograph of the attendee entering a particular venue, from a particular vantage point or location, or at another point of interest (e.g., a photo booth, sculpture, installation, etc.). Content may also include a "heat map" indicating where the attendee spent the greatest amount of time during the event, a list indicating the venue, locations and/or proceedings which he/she visited or witnessed during the event. In addition, other information relating to the event, such as musical performances, artists, sporting events, athletes, etc. which the attendee saw or experienced may be made available. Content relating to an event may be made available to an attendee via a website, a display on-site at an event, via a mobile application, and/or using any other suitable mechanism(s). Further, content may be made available to an attendee after, during and/or before the event occurs.

It should be appreciated that embodiments of the invention are not limited to making content available to an attendee using a timeline representation, and that content captured during an event may be made available to an attendee in any suitable manner. For example, some embodiments of the invention may include a display of content in a non-timeline-based but otherwise chronological form, on a map, or in any other suitable form. The content which is made available to an attendee may be "raw" content (e.g., roughly as witnessed by the attendee) or it may be filtered, modified, augmented, segmented, remixed and/or otherwise modified (e.g., by the event organizer) to provide any desired experience. Such modification may be performed automatically, manually or using some combination of automatic and manual techniques. In some embodiments, an attendee may edit or modify the content made available to him/her. For example, an attendee may, after viewing his/her timeline, indicate that some content (e.g., particular photos depicting the attendee) is to be disregarded.

As noted above, in some embodiments content may be captured in response to user input having been received. For example, the wearable device 102 shown in FIG. 1 includes a user input component 106, which may comprise a button, vibration sensor, capacitive sensor and/or other mechanism(s) that may be actuated by an attendee. In some embodiments, an attendee may supply input to request that content depicting a particular moment be captured for later access. For example, an attendee may wish to capture a snapshot of a moment for sentimental reasons.

Attendee input requesting content capture may be received and processed in any suitable fashion. In some embodiments, when an attendee actuates user input component 106 in wearable device 102, processor 104 causes a payload (e.g., a subsequently transmitted payload, a payload transmitted contemporaneously with the user's input, and/or a payload transmitted at any other suitable juncture(s)) to include an instruction to capture content at the time the payload is received. The content so captured may then be associated with the identifier of the wearable device (e.g., also indicated in the payload), so that the content may thereafter be associated with the attendee and made available to him/her. In some embodiments, an attendee may be allowed to request multiple content segments (e.g., snapshots).

In some embodiments, content capture may be initiated absent any affirmative input received from the attendee. For example, content capture may be initiated automatically when information is received which indicates that such initiation is appropriate. For example, content capture may be initiated automatically when information is received which indicates that the attendee is moving (e.g., dancing), that noise levels at the event have exceeded a particular threshold level, that the attendee's heartbeat and/or other biometric information indicates the attendee has become excited, and/or based upon any other suitable information. Any suitable components may be employed to capture and/or report the information upon which a decision to automatically initiate content capture may be based.

Some embodiments of the invention recognize that not all payloads which are transmitted by a wearable device will be received by a receiver component (e.g., because the wearable device was located too far away from any receiver component when the payload was transmitted). As a result, a wearable device 102 may store (e.g., in memory 108 (FIG. 1), which may be volatile, non-volatile, or both) a record of one or more payloads transmitted during an event, such as payloads transmitted in response to user input being received. A record of the payload(s) may thereafter be sent to a receiver component 152 and/or storage facility 182 for association with other, previously received payloads. The record may be sent at any suitable juncture and in any suitable fashion.

A content capture request need not be transmitted by a wearable device. For example, in some embodiments in which attendees employ mobile devices in addition to transporting wearable devices, a connection may be maintained between an attendee's wearable device and her mobile device, and the wearable device may instruct the mobile device to issue the content capture request and, in some embodiments, a point in time associated with the request. In other embodiments, an attendee may request content capture by providing input to the mobile device rather than to the wearable device, or to both devices.

Figure 5:
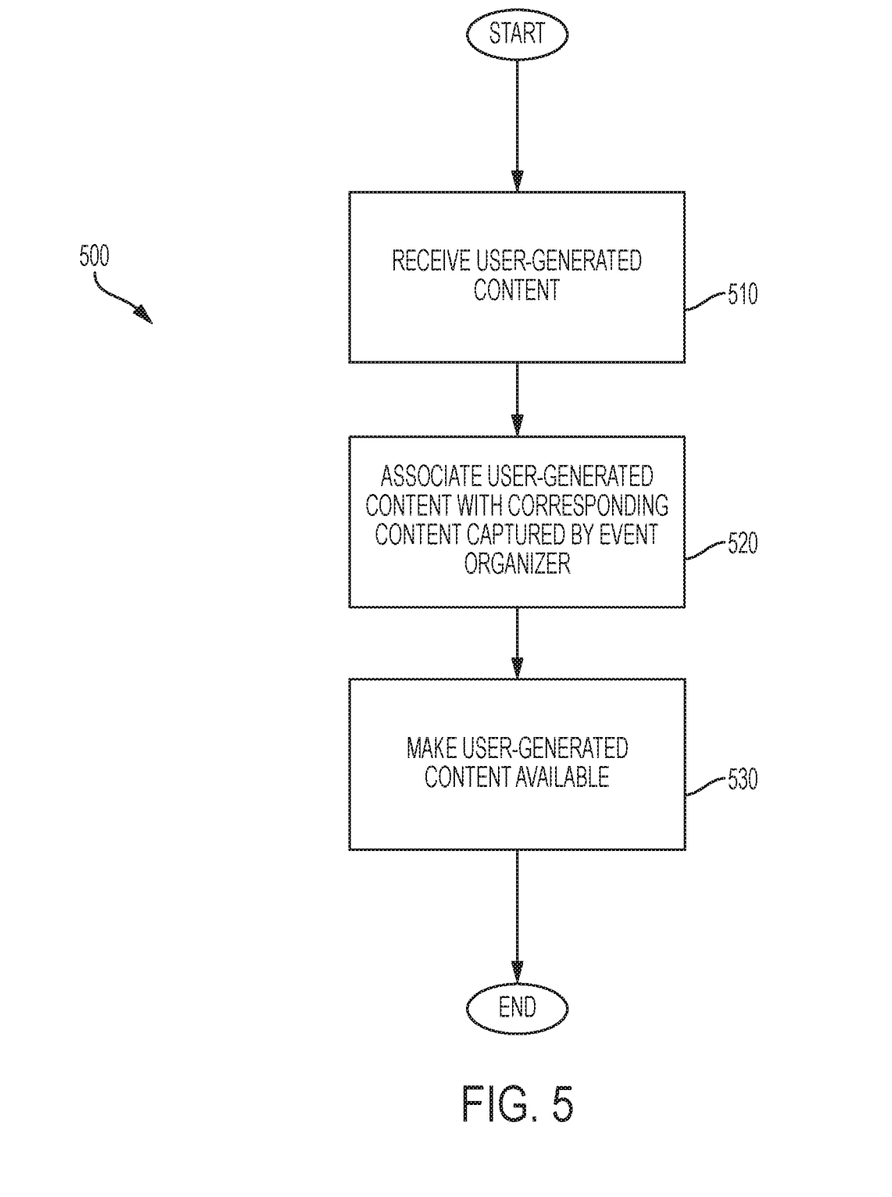
FIG. 5 is a flowchart depicting a representative process for associating content generated by devices operated by event attendees with content captured by event organizers, in accordance with some embodiments of the invention.

FIG. 5 depicts a representative process 500 for enabling one attendee of an event to share user-generated content with other attendees. At the start of representative process 500, user-generated content is received from the attendee in the act 510. User-generated content may take any suitable form(s). For example, an attendee may capture video, images, text and/or audio content using a camera, sound recorder, mobile device having applications executing thereon, or any other suitable component(s).

In the act 520, the content received in the act 510 is correlated with corresponding content captured by event organizers. This may be performed in any suitable fashion. For example, a time of content capture provided with the user-generated content (e.g., recorded by the attendee's device) may be correlated to corresponding times of capture for content recorded by event organizers, and/or one or more other entities.

In act 530, user-generated content (e.g., along with non-user-generated content) is made available. Content captured by one attendee of an event may be distributed to other attendees in any suitable fashion, using any suitable vehicle(s). For example, content captured by one attendee may be made available (e.g., suggested, highlighted, etc.) to other attendees on timelines (and/or other presentation vehicles) generated for the other attendees, such as if the other attendees were at the same location as the one attendee, or nearby locations, at the time the content was captured, or if the other attendees have a relationship with the one attendee. Relationships between attendees may be established in any suitable fashion and at any suitable juncture (e.g., before, during and/or after an event).

The other attendees to whom user-generated content is distributed may be identified in any suitable fashion, and the user-generated content may be shared with the other attendees using any suitable vehicle. In some embodiments, content which is captured by attendees may be vetted, filtered, modified or otherwise processed by an organizer of an event prior to distribution of the content to other attendees of the event.

It should be appreciated, of course, that content captured by one event attendee need not be shared with other attendees. For example, in some embodiments content captured by an attendee may be kept private to that attendee, for display to only him/her.

Some embodiments of the invention may provide attendees with information based upon their location, as indicated by the location of one or more receiver components that receive payload (e.g., from the attendee's wearable device). For example, when an attendee's location is known at a particular time (e.g., as a result of a wearable device transported by the attendee and/or a mobile device operated by the attendee transmitting a payload to a receiver component at a known location), event organizers may make various information available to the attendee, such as nearby points of interest (e.g., upcoming acts performing nearby), ongoing activity, points of interest, and/or other location- and/or time-based information. Information on nearby points of interest may be made available in any suitable fashion, such as via an app executing on a mobile device operated by the attendee, one or more other devices, etc. Further, the information may take any of numerous forms. For example, the information may include the attendee's current location on a venue map; text, images and/or other forms of information on current or upcoming nearby performances and related information; and/or other information.

It should be appreciated that location- and/or time-based information need not be made available to attendees via bidirectional communication between one or more components operated by event organizers and a mobile device operated by an attendee. For example, an app executing on the attendee's mobile device may display information on a location which was previously extracted from a database, in response to determining that the attendee has reached that location. Any suitable technique(s), employing any suitable mode(s) of communication, may be used for identifying and/or presenting information to an attendee.

Figure 6:
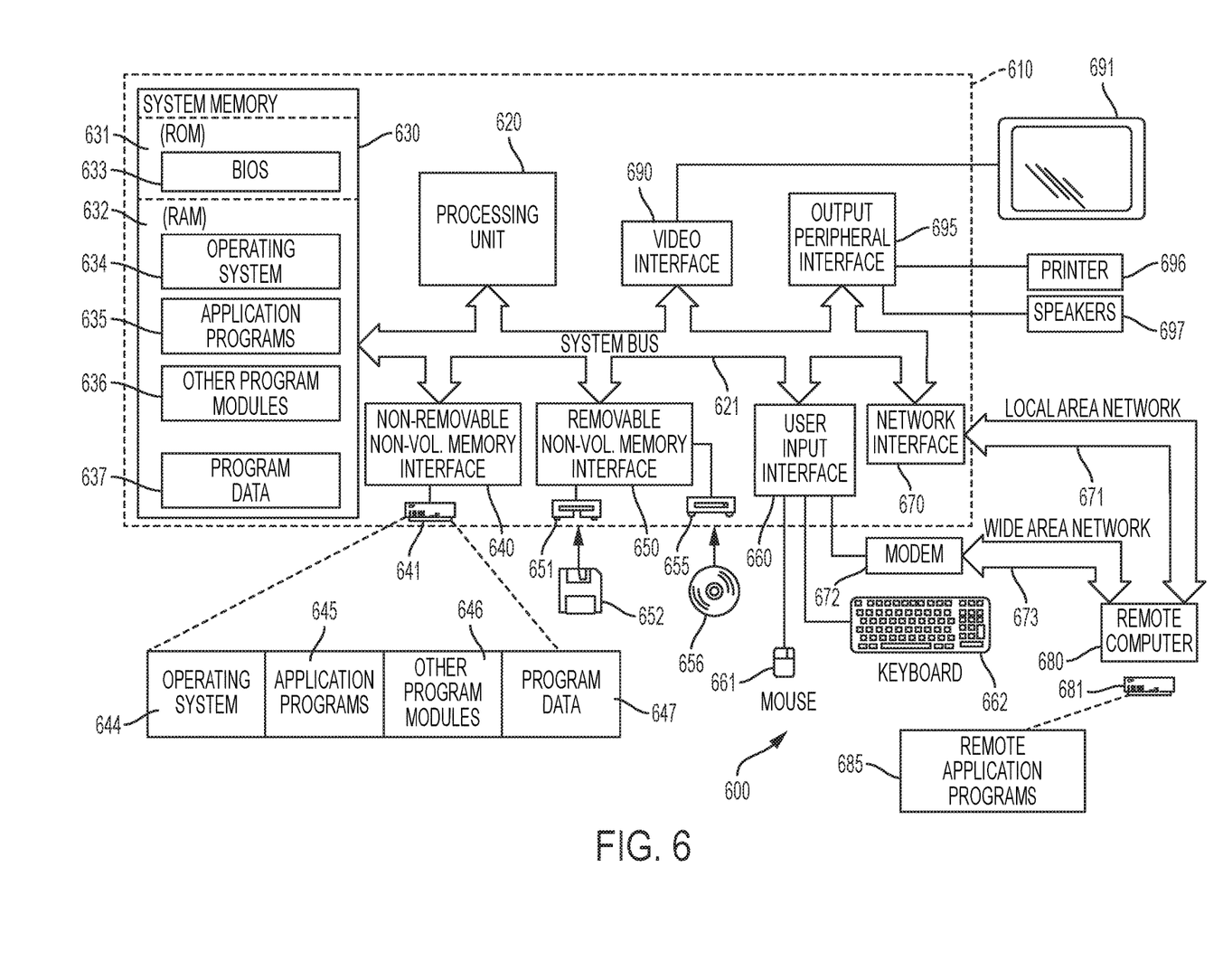
FIG. 6 is a block diagram depicting a representative computer system which may be used to implement certain aspects of the invention.

FIG. 6 illustrates one example of a suitable computing system 600 which may be used to implement certain aspects of the invention. The computing system 600 is only one example of a suitable computing system, and is not intended to suggest any limitation as to the scope of use or functionality of the invention. Neither should the computing system 600 be interpreted as having any dependency or requirement relating to any one or combination of components illustrated in the exemplary computing system 600. In this respect, embodiments of the invention are operational with numerous other general purpose or special purpose computing systems or configurations. Examples of well-known computing systems and/or configurations that may be suitable for use with the invention include, but are not limited to, personal computers, server computers, mobile or laptop devices, multiprocessor systems, microprocessor-based systems, set top boxes, programmable consumer electronics, network PCs, minicomputers, mainframe computers, distributed computing systems that include any of the above systems or devices, and the like.

The computing system may execute computer-executable instructions, such as program modules. Generally, program modules include routines, programs, objects, components, data structures, etc. that perform particular tasks or implement particular abstract data types. The invention may also be practiced in distributed computing systems where tasks are performed by remote processing devices that are linked through a communications network. In a distributed computing system, program modules may be located in both local and remote computer storage media including memory storage devices.

FIG. 6 depicts a general purpose computing device in the form of a computer 610. Components of computer 610 may include, but are not limited to, a processing unit 620, a system memory 630, and a system bus 621 that couples various system components including the system memory to the processing unit 620. The system bus 621 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 610 typically includes a variety of computer readable media. Computer readable media can be any available media that can be accessed by computer 610 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media include, but are not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other one or more media which may be used to store the desired information and may be accessed by computer 610. Communication media typically embody computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared and other wireless media. Combinations of the any of the above should also be included within the scope of computer readable media.

The system memory 630 includes computer storage media in the form of volatile and/or nonvolatile memory such as read only memory (ROM) 631 and random access memory (RAM) 632. A basic input/output system 633 (BIOS), containing the basic routines that help to transfer information between elements within computer 610, such as during start-up, is typically stored in ROM 631. RAM 632 typically contains data and/or program modules that are immediately accessible to and/or presently being operated on by processing unit 620. By way of example, and not limitation, FIG. 6 illustrates operating system 634, application programs 635, other program modules 636, and program data 637.

The computer 610 may also include other removable/non-removable, volatile/nonvolatile computer storage media. By way of example only, FIG. 6 illustrates a hard disk drive 641 that reads from or writes to non-removable, nonvolatile magnetic media, a magnetic disk drive 651 that reads from or writes to a removable, nonvolatile magnetic disk 652, and an optical disk drive 655 that reads from or writes to a removable, nonvolatile optical disk 656 such as a CD ROM or other optical media. Other removable/non-removable, volatile/nonvolatile computer storage media that can be used in the exemplary computing system include, but are not limited to, magnetic tape cassettes, flash memory cards, digital versatile disks, digital video tape, solid state RAM, solid state ROM, and the like. The hard disk drive 641 is typically connected to the system bus 621 through an non-removable memory interface such as interface 640, and magnetic disk drive 651 and optical disk drive 655 are typically connected to the system bus 621 by a removable memory interface, such as interface 650.

The drives and their associated computer storage media discussed above and illustrated in FIG. 6, provide storage of computer readable instructions, data structures, program modules and other data for the computer 610. In FIG. 6, for example, hard disk drive 641 is illustrated as storing operating system 644, application programs 645, other program modules 646, and program data 647. Note that these components can either be the same as or different from operating system 634, application programs 635, other program modules 536, and program data 637. Operating system 644, application programs 645, other program modules 646, and program data 647 are given different numbers here to illustrate that, at a minimum, they are different copies. A user may enter commands and information into the computer 610 through input devices such as a keyboard 662 and pointing device 661, commonly referred to as a mouse, trackball or touch pad. Other input devices (not shown) may include a microphone, joystick, game pad, satellite dish, scanner, or the like. These and other input devices are often connected to the processing unit 620 through a user input interface 560 that is coupled to the system bus, but may be connected by other interface and bus structures, such as a parallel port, game port or a universal serial bus (USB). A monitor 691 or other type of display device is also connected to the system bus 621 via an interface, such as a video interface 690. In addition to the monitor, computers may also include other peripheral output devices such as speakers 697 and printer 696, which may be connected through a output peripheral interface 695.

The computer 610 may operate in a networked environment using logical connections to one or more remote computers, such as a remote computer 680. The remote computer 680 may be a personal computer, a server, a router, a network PC, a peer device or other common network node, and typically includes many or all of the elements described above relative to the computer 610, although only a memory storage device 681 has been illustrated in FIG. 6. The logical connections depicted in FIG. 6 include a local area network (LAN) 671 and a wide area network (WAN) 673, but may also include other networks. Such networking environments are commonplace in offices, enterprise-wide computer networks, intranets and the Internet.

When used in a LAN networking environment, the computer 610 is connected to the LAN 671 through a network interface or adapter 670. When used in a WAN networking environment, the computer 610 typically includes a modem 672 or other means for establishing communications over the WAN 673, such as the Internet. The modem 672, which may be internal or external, may be connected to the system bus 621 via the user input interface 660, or other appropriate mechanism. In a networked environment, program modules depicted relative to the computer 610, or portions thereof, may be stored in the remote memory storage device. By way of example, and not limitation, FIG. 6 illustrates remote application programs 685 as residing on memory device 681. It will be appreciated that the network connections shown are exemplary and other means of establishing a communications link between the computers may be used.

Embodiments of the invention may be embodied as a computer readable storage medium (or multiple computer readable media) (e.g., a computer memory, one or more floppy discs, compact discs (CD), optical discs, digital video disks (DVD), magnetic tapes, flash memories, circuit configurations in Field Programmable Gate Arrays or other semiconductor devices, or other tangible computer storage medium) encoded with one or more programs that, when executed on one or more computers or other processors, perform methods that implement the various embodiments of the invention discussed above. As is apparent from the foregoing examples, a computer readable storage medium may retain information for a sufficient time to provide computer-executable instructions in a non-transitory form. Such a computer readable storage medium or media can be transportable, such that the program or programs stored thereon can be loaded onto one or more different computers or other processors to implement various aspects of the present invention as discussed above. As used herein, the term "computer-readable storage medium" encompasses only a tangible machine, mechanism or device from which a computer may read information. Alternatively or additionally, the invention may be embodied as a computer readable medium other than a computer-readable storage medium. Examples of computer readable media which are not computer readable storage media include transitory media, like propagating signals.

Having thus described several aspects of at least one embodiment of this invention, it is to be appreciated that various alterations, modifications, and improvements will readily occur to those skilled in the art. Such alterations, modifications, and improvements are intended to be part of this disclosure, and are intended to be within the spirit and scope of the invention. Further, though advantages of the present invention are indicated, it should be appreciated that not every embodiment of the invention will include every described advantage. Some embodiments may not implement any features described as advantageous herein and in some instances. Accordingly, the foregoing description and drawings are by way of example only.

Various aspects of the present invention may be used alone, in combination, or in a variety of arrangements not specifically discussed in the embodiments described in the foregoing and is therefore not limited in its application to the details and arrangement of components set forth in the foregoing description or illustrated in the drawings. For example, aspects described in one embodiment may be combined in any manner with aspects described in other embodiments.

The invention may be embodied as a method, of which an example has been described. The acts performed as part of the method may be ordered in any suitable way. Accordingly, embodiments may be constructed in which acts are performed in an order different than illustrated, which may include different acts than those which are described, and/or which may involve performing some acts simultaneously, even though the acts are shown as being performed sequentially in the embodiments specifically described above.

Use of ordinal terms such as "first," "second," "third," etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

Also, the phraseology and terminology used herein is for the purpose of description and should not be regarded as limiting. The use of "including," "comprising," or "having," "containing," "involving," and variations thereof herein, is meant to encompass the items listed thereafter and equivalents thereof as well as additional items.

What is claimed is:

1. A method, comprising acts of:
(A) receiving a plurality of transmissions over a period of time, from a device adapted to be worn by a user, by one or more of a plurality of receiver components each deployed at a location at which an event occurs, one or more of the plurality of transmissions comprising an instruction from a user of the device to capture content, the location comprising a plurality of physically separate zones in which distinct event proceedings occur;
(B) determining, based at least in part on a time at which each one of the plurality of transmissions was received by one or more of the plurality of receiver components and a location of each of the one or more receiver components when the one transmission was received, a particular zone of the plurality of zones that was viewable by the user at the time of the one transmission and a vantage point from which the event proceedings in the particular zone were then viewable by the user, wherein determining the particular zone and vantage point viewable by the user at the time of a first transmission of the plurality of transmissions comprises processing information, provided by the first transmission, that is received by more than one of the plurality of receiver components;

(C) causing content relating to the event proceedings to be captured by a plurality of content capture components each deployed at the location;

(D) identifying a plurality of portions of the captured content as having each been captured from a vantage point and at a time when the event proceedings in the zone represented in the portion of captured content were viewable by the user, wherein the identified plurality of portions comprises a first portion captured from a first vantage point of a first event proceeding in a first zone as the first zone was viewable by the user, and a second portion captured from a second vantage point of a second event proceeding in a second zone as the second zone was viewable by the user; and (E) enabling the user to access and edit the identified plurality of portions of captured content.

2. The method of claim 1, wherein the act (E) comprises enabling the user to access an indication of an amount of time that he/she spent in each of the plurality of zones during the event.

3. The method of claim 1, wherein the act (A) comprises receiving an identifier for the device.

4. The method of claim 1, wherein the act (B) involves determining the particular zone and vantage point viewable by the user at the time of the first transmission based at least in part on information discerned by each of the multiple receiver components from the one transmission.

5. The method of claim 4, wherein the information discerned by each of the multiple receiver components comprises a received signal strength.

6. The method of claim 1, wherein the act (A) comprises receiving the plurality of transmissions by one or more receiver components configured to move within the location over time.

7. The method of claim 1, wherein the act (C) comprises causing content to be captured by a plurality of content capture components, each associated with a particular receiver component.

8. The method of claim 1, wherein the causing of the capture of content in the act (C) is performed in response to receiving the transmissions in the act (A).

9. The method of claim 1, wherein the act (C) comprises causing content depicting the user to be captured.

10. The method of claim 1, wherein the act (E) comprises making the identified one or more portions of captured content available to the user via a timeline representation.

11. The method of claim 10, wherein the timeline representation associates different portions of content with different points in time.

12. The method of claim 1, further comprising an act of:
(F) enabling the user to share the identified plurality of portions of captured content with other users.

13. The method of claim 1, wherein the event is a concert, sporting event or exhibition.

14. The method of claim 1, wherein the act (C) comprises causing content to be captured which includes one or more of video, audio, and text.

15. The method of claim 1, wherein:
the act (A) comprises receiving, by one or more of the plurality of receiver components, an indication of user input having been supplied to the device;
the act (B) comprises determining an approximate location of the device when the user input was supplied;
the act (D) comprises identifying one or more first portions of the captured content as having each been captured by a content capture component of the plurality of content capture components located nearby one of the receiver components at a time when the user input was supplied; and
the act (E) comprises making the identified one or more first portions of captured content available to the user.

16. At least one non-transitory computer-readable storage medium having instructions encoded thereon which, when executed in a system comprising at least one computer, cause the at least one computer to perform a method comprising acts of:

(A) accessing data on a plurality of transmissions received over a period of time, from a device adapted to be worn by a user, by one or more of a plurality of receiver components each deployed at a location at which an event occurs, one or more of the plurality of transmissions comprising an instruction from a user of the device to capture content, the location comprising a plurality of physically separate zones in which distinct event proceedings occur;

(B) determining, based at least in part on data indicating a time at which each one of the plurality of transmissions was received by one or more of the plurality of receiver components and a location of each of the one or more receiver components when the one transmission was received, a particular zone of the plurality of zones that was viewable by the user at the time of the one transmission and a vantage point from which the event proceedings in the particular zone were then viewable by the user, wherein determining the particular zone and vantage point viewable by the user at the time of a first transmission of the plurality of transmissions comprises processing information, provided by the first transmission, that is received by more than one of the plurality of receiver components;

(C) causing content relating to the event proceedings to be captured by a plurality of content capture components each deployed at the location;

(D) identifying a plurality of portions of the captured content as having each been captured from a vantage point and at a time when the event proceedings in the zone represented in the portion of captured content were viewable by the user, wherein the identified plurality of portions comprises a first portion captured from a first vantage point of a first event proceeding in a first zone as the first zone was viewable by the user, and a second portion captured from a second vantage point of a second event proceeding in a second zone as the second zone was viewable by the user; and (E) enabling the user to access and edit the identified plurality of portions of captured content.

17. Apparatus, comprising:
at least one non-transitory computer-readable storage medium, having instructions encoded thereon; and
at least one computer processor, programmed via the instructions to:
access data on a plurality of transmissions received over a period of time, from a device adapted to be worn by a user, by one or more of a plurality of receiver components each deployed at a location at which an event occurs, one or more of the plurality of transmissions comprising an instruction from a user to capture content, the location comprising a plurality of physically separate zones in which distinct event proceedings occur;
determine, based at least in part on data indicating a time at which each one of the plurality of transmissions was received by one or more of the plurality of receiver components and a location of each of the one or more receiver components when the one transmission was received, a particular zone of the plurality of zones that was viewable by the user at the time of the one transmission and a vantage point from which the event proceedings in the particular zone were then viewable by the user, wherein determining the particular zone and vantage point viewable by the user at the time of a first transmission of the plurality of transmissions comprises processing information, provided by the first transmission, that is received by more than one of the plurality of receiver components;

cause content relating to the event proceedings to be captured by a plurality of content capture components each deployed at the location;

identify a plurality of portions of the captured content as having each been captured from a vantage point and at a time when the event proceedings in the zone represented in the portion of captured content were viewable by the user, wherein the identified plurality of portions comprises a first portion captured from a first vantage point of a first event proceeding in a first zone as the first zone was viewable by the user, and a second portion captured from a second vantage point of a second event proceeding in a second zone as the second zone was viewable by the user; and enable the user to access and edit the identified plurality of portions of captured content.

18. The apparatus of claim 17, wherein the at least one computer processor is programmed to access data comprising an identifier for the device.

19. The apparatus of claim 17, wherein the at least one computer processor is programmed to determine the particular zone and vantage point viewable by the user at the time of the first transmission based at least in part on information discerned by each of the multiple receiver components from the one transmission.

20. The apparatus of claim 19, wherein the information discerned by each of the multiple receiver components comprises a received signal strength.

21. The apparatus of claim 17, wherein the at least one computer processor is programmed to access data on transmissions received by one or more receiver components configured to move within the location over time.

22. The apparatus of claim 17, wherein the at least one computer processor is programmed to cause content to be captured by a plurality of content capture components, each associated with a particular receiver component.

23. The apparatus of claim 17, wherein the at least one computer processor is programmed to make the identified one or more portions of captured content available to the user via a timeline representation.

24. The apparatus of claim 23, wherein the timeline representation associates different portions of content with different points in time.

25. The apparatus of claim 17, wherein the at least one computer processor is programmed to enable the user to share the identified one or more portions of captured content with other users.

26. The apparatus of claim 17, wherein the at least one computer processor is programmed to cause content to be captured which includes one or more of video, audio, and text.

27. The apparatus of claim 17, wherein the at least one computer processor is programmed to:

access an indication, received by one or more of the plurality of receiver components, of user input having been supplied to the device;

determine an approximate location of the device when the user input was supplied;

identify one or more first portions of the captured content as having each been captured by a content capture component of the plurality of content capture components located nearby one of the receiver components at a time when the user input was supplied; and make the identified one or more first portions of captured content available to the user.

28. The apparatus of claim 17, wherein the at least one computer processor is programmed to cause the content relating to the event proceedings to be captured in response to the vantage point from which the event proceedings were viewable by the user being determined.

* * * * *